United States Patent [19]

Wu

[11] Patent Number: 5,322,910

[45] Date of Patent: Jun. 21, 1994

[54] ETHYLENE POLYMERIZATION

[75] Inventor: An-hsiang Wu, Bartlesville, Okla.

[73] Assignee: Phillips Petroleum Company, Bartlesville, Okla.

[21] Appl. No.: 123,009

[22] Filed: Sep. 17, 1993

Related U.S. Application Data

[62] Division of Ser. No. 979,108, Nov. 20, 1992, Pat. No. 5,272,124.

[51] Int. Cl.$^5$ .............................................. C08F 4/18
[52] U.S. Cl. ..................... 526/107; 526/113; 526/170; 526/171; 526/172; 526/352; 526/130; 526/146
[58] Field of Search ............... 526/107, 113, 170, 171, 526/172, 130, 146

[56] References Cited

U.S. PATENT DOCUMENTS

| | | | |
|---|---|---|---|
| 3,635,937 | 1/1972 | Bauer et al. | 260/94.9 C |
| 3,637,636 | 1/1972 | Bauer et al. | 260/94.9 B |
| 3,644,563 | 2/1972 | Bauer et al. | 260/683.15 D |
| 3,644,564 | 2/1972 | van Zwet et al. | 260/683.15 D |
| 3,647,915 | 3/1972 | Bauer et al. | 260/683.15 D |
| 3,686,159 | 8/1972 | Bauer et al. | 260/94.9 C |
| 3,759,889 | 9/1973 | Bauer et al. | 260/94.9 C |
| 4,482,640 | 11/1984 | Knudsen et al. | 502/155 |
| 4,518,814 | 5/1985 | Knudsen et al. | 585/523 |

OTHER PUBLICATIONS

John Boor, Jr., Ziegler–Natta Catalysts and Polymerizations, 1979, pp. 305–308, 321, 322 (1979).

M. Peuckert et al, Organometalics, A New Nickel Complex for the Oligomerization of Ethylene, vol. 2, pp. 594–597 (1983).

Frank C. Whitmore, "Organic Chemistry", 1937, 691–703.

Primary Examiner—Joseph L. Schofer
Assistant Examiner—David Wu
Attorney, Agent, or Firm—Lynda S. Jolly

[57] ABSTRACT

Olefins are polymerized with a catalyst system composition comprising a nickel compound and an aromatic carboxylic acid wherein there is a heteroatom linkage between the aromatic moiety and the carboxylic acid functional group. The novel catalyst system composition can be heterogeneous or homogeneous. This composition allows the production of one or more olefin polymers which have a very high molecular weight.

15 Claims, No Drawings

ETHYLENE POLYMERIZATION

This application is a division of application Ser. No. 07/979,108, filed Nov. 20, 1992, now U.S. Pat. No. 5,272,124 the entirety of which is herein incorporated by reference, now allowed.

BACKGROUND OF THE INVENTION

This invention relates to novel catalyst systems and processes for the polymerization of mono-1-olefins.

A variety of catalyst systems, both homogeneous and heterogeneous, have been utilized to convert mono-1-olefins, such as ethylene, into polymeric products of high molecular weight. The use of some nickel catalysts, combined with phosphorous compounds, to oligomerize and polymerize mono-1-olefins is known in the art. Unfortunately, these catalyst systems for polymerization of mono-1-olefins, are not high productivity catalyst systems and do not produce a high molecular weight polymerization product.

Because of the increasing importance that ploymers are playing in the chemical industry, processes which make even slight improvements in the availability of novel desired polymers over existing catalyst systems and processes are highly desirable.

SUMMARY OF THE INVENTION

Therefore, it is an object of this invention to provide novel improved catalyst systems for mono-1-olefin polymerization.

A further object of this invention is to provide an improved process for the polymerization of mono-1-olefins.

Therefore, in accordance with one embodiment of this invention, catalyst system compositions are provided, which are useful to polymerize one or more mono-1-olefin and form high molecular weight polymers. These improved catalyst system compositions comprise a nickel compound selected from the group consisting of bis-(1,5-cyclooctadiene) nickel, bis(tricyclohexylphosphine) nickel, nickel tetracarbonyl, (cyclododecatriene) nickel, bis(ethylene)(dicyclohexylphosphine) nickel, and mixtures thereof and at least one aromatic carboxylic acid wherein there is a heteroatom linkage between the aromatic moiety and the carboxylic acid functional group.

In accordance with another embodiment of the invention, one or more mono-1-olefins can be polymerized with these novel catalyst system compositions to produce high molecular weight ethylene polymers.

DESCRIPTION OF THE PREFERRED EMBODIMENTS

Catalyst Systems

The inventive catalyst system compositions comprise a nickel compound and at least one aromatic carboxylic acid wherein there is a heteroatom linkage between the aromatic moiety and the carboxylic acid functional group.

The nickel compound, or nickel component, of the catalyst system, preferably, is in a zero valence state, or the nickel compound should be able to undergo reduction to a zero valence state, before formation of an active nickel component. Preferably, the nickel compound is an organo-nickel compound. The organic component of the organo-nickel nickel compound can be any organic component having less than about 20 carbon atoms per radical. Preferably, the organic component of the nickel compound is an unsaturated compound, having less than about 15 carbon atoms per radical. Exemplary nickel compounds are selected from the group consisting of bis(1,5-cyclooctadiene) nickel(0), bis(tricyclohexylphosphine) nickel(0), nickel tetracarbonyl, (cyclododecatriene) nickel, bis(ethylene)(dicyclohexylphosphine) nickel, and mixtures thereof. Most preferably, the most nickel compound is bis(1,5-cyclooctadiene) nickel, ((COD)$_2$Ni), due to ease of use and availability, best catalytic activity, and best stability.

The aromatic carboxylic acid component of the catalyst system comprises an aromatic moiety and a carboxylic acid functional group, as at least one ligand, with a heteroatom linkage between the aromatic moiety and carboxylic acid functional group. The aromatic carboxylic acid component has a general formula of:

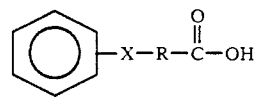

In the above formula, X is selected from the group consisting of oxygen (O) or sulfur (S), for best catalytic activity and productivity. R is selected from alkylene groups, wherein R has from 1 to about 10 carbon atoms per group. Exemplary aromatic carboxylic acids include, but are not limited to, thiophenoxyacetic acid and phenoxyacetic acid.

Thiophenoxyacetic acid and phenoxyacetic acid are most preferred for best catalyst system activity and productivity.

The order of addition of the two catalyst system components is thought not to be critical in the present invention. However, preferably, the inventive catalyst system composition is prepared by contacting the nickel compound in a solvent with an aromatic carboxylic acid in a solvent. As used in this disclosure, the term "solvent" refers to the compound capable of dissolving, or disassociating, one or more catalytic components. However, by no means, is the solvent necessarily an inert material; it is possible that the solvent can contribute to catalytic activity and selectivity.

The solvent can be any aromatic or aliphatic organic solvent, such as, for example, cyclic or acyclic, linear or branched compounds which can affect a reaction between the nickel compound and aromatic carboxylic acid. Exemplary solvents are selected from the group consisting of aromatic hydrocarbons, alcohols, amides, ethers, esters, ketones, nitriles, and chlorinated aromatic compounds. Preferably, a solvent is selected from the group consisting of aromatic hydrocarbons and alcohols due to increased compatibility with both a nickel compound and an aromatic carboxylic acid.

The amount of nickel compound and aromatic carboxylic acid used to form a catalyst system can be any amount sufficient to prepare an effective catalyst system. Generally, the molar ratio of aromatic carboxylic acid to nickel compound used is within a range of about 0.1 to about 10 moles of aromatic carboxylic acid per mole of nickel compound. Preferably, about 0.5 to about 2.0 moles of aromatic carboxylic acid are used per mole of nickel compound. Too much aromatic carboxylic acid can completely deactivate the catalyst system composition; too little aromatic carboxylic acid can result in an ineffective catalyst system composition. Too much nickel compound can result in a catalyst system which is not useful for polymerization of olefins; too little nickel compound can result in an ineffective catalyst system composition.

Catalyst system components cab be contacted under any conditions sufficient to form an active catalyst system composition. Conditions of time, temperature, pressure, and even component concentration, can impact each other. For example, if a higher temperature is used, less reaction time can be necessary. Generally, times can be within a range of from about 5 seconds to about 3 days, temperature can vary from about 0° C. to about 150° C., and pressure can range up to about 5000 psig. For ease of preparation, ambient temperatures and pressures can be employed, and the solvent(s) selected are those which are liquid under the chosen reaction conditions.

Optionally, a supported catalyst system can be prepared using any support useful to support catalysts. Exemplary catalyst supports include, but are not limited to, inorganic oxides, either alone or in combination, phosphated, silated, and/or fluorided oxides, and mixtures thereof. Particularly preferred are supports selected from the group consisting of silica, silica-alumina, alumina, fluorided alumina, silated alumina, thoria, aluminophosphate, aluminum phosphate, phosphated silica, phosphate alumina, silica-titania, co-precipitated silica/titania, fluorided/silated alumina, and mixtures thereof. The presently most preferred catalyst support because of greatest polymerization activity is aluminophosphate, as disclosed in U.S. Pat. No. 4,364,855 (1982), herein incorporated by reference.

As used in this disclosure, the term "support" refers to a carrier for one or more other catalytic components. However, by no means, is the support necessarily a inert material; it is possible that the support can contribute to catalytic activity and selectivity.

A supported catalyst system can be prepared according to any method known in the art. Generally, the support can be added to, and slurried with, a solution containing a nickel compound, an aromatic carboxylic acid, and a solvent. After sufficient contact time, excess liquid can be decanted, a solid catalyst system composition product recovered, and, optionally, dried, and utilized for olefin polymerization.

Reactants

Reactants applicable for use with the catalysts and processes of this invention are olefinic compounds which can polymerize, i.e., react, with other olefinic compounds. The catalysts of the invention can be used to polymerize at least one mono-1-olefin having 2 to about 8 carbon atoms per molecule. Exemplary compounds include, but are not limited to, ethylene, propylene 1-butene, 1-pentene, 1-hexene, and 1-octene.

This invention is of particular applicability in producing ethylene homopolymers and copolymers from mixtures of ethylene and about 0.5 to about 20 mole percent of one or more comonomers selected from 1-olefins having about 3 to about 8 carbon atoms per molecule. Exemplary comonomers include, but are not limited to, aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably about 97 to about 99.6 weight percent polymerized ethylene units. Propylene, 1-butene, 1-pentene, 1-hexene and 1-octene are especially preferred comonomers for use with ethylene.

Reaction Conditions

Polymers can be prepared from catalyst systems of this invention by solution, slurry (particle form), and gas phase polymerization techniques using conventional equipment and contacting processes. Contacting of the monomer or monomers with the catalyst system can be affected by any manner known in the art of solid catalyst systems. One convenient method is to suspend the catalyst system in the organic medium and to agitate the mixture in order to maintain the catalyst system in suspension throughout the polymerization process. Other known contacting methods such as fluidized bed, gravitating bed, and fixed bed can also ne employed. Catalyst systems for process as disclosed in Witt, U.S. Pat. No. 3,724,063 the disclosure of which is hereby incorporated by reference.

Catalyst systems of this invention are particularly suitable for use in slurry, or particle form, polymerization processes. The slurry process is generally carried out in an inert diluent (medium), such as a paraffin, cycloparaffin or aromatic hydrocarbon. For predominantly ethylene polymers, a temperature within a range of about 66° C. to about 110° C. is employed. The diluent and temperature are selected such that the polymer is produced as solid particles and is recovered in that form. Pressures in the particle form process can vary from about 110 to about 700 psia (0.76-4.8 MPa). The catalyst system is kept in suspension and is contacted with an amount of monomers at sufficient pressure to maintain the medium and at least a portion of the monomer or monomers in the liquid phase.

Generally, in slurry polymerization of ethylene homopolymer and predominantly ethylene copolymer systems, the feasible temperature range is about 93° to about 110° C. Commercial systems are operated as close to the maximum as possible, i.e., about 107°±3° C., in order to obtain the highest possible melt index without polymer product going into solution. Catalyst systems of this invention allow operating at the low end to this range, i.e., about 96°±3° C., in systems normally employing a temperature of about 107° C. The lower temperature gives a relatively higher monomer partial pressure, thus giving higher activity.

Hydrogen can be added to the reactor to alter the molecular weight of the polymer.

Products

Polymers produced in accordance with this invention are ultra-high molecular weight polymers. The molecular weight is sufficiently high such that the resultant polymer has a melt index (MI) of zero (0) g/10 minutes and a high-load melt index (HLMI) of zero (0) g/10 minutes. Furthermore, the polymer, at the time of filing this application is insoluble in numerous solvents, and therefore, cannot be analyzed further.

EXAMPLES

The following examples illustrate various aspects of the invention. Data are included for each example about the polymerization conditions, as well as the resultant polymer production.

Catalyst systems used were prepared in a round-bottom flask (100 mL) by combining 0.15 grams bis(1,5-cyclooctadiene)nickel(0), 4.5 grams aluminophosphate (0.4 P/Al molar ratio, activated at 700° C.), prepared in accordance with U.S. Pat. No. 4,364,855 (1982), herein incorporated by reference, and 0.092 grams thiophenoxyacetic acid or 0.082 g phenoxyacetic acid in toluene (50 mL) solution. The catalyst system composition components were combined at ambient temperature with a ethylene stream bubbling through the reaction mixture, and mixed for 30 minutes. The slurry catalyst system composition was stored under a cool ($\sim 0°$ C.) nitrogen atmosphere until ready for use.

Unless otherwise indicated, polymerizations were completed in a 316 stainless steel, 3000CC autoclave reactor at 50° C., using the previously prepared catalyst system slurry. Approximately 50 mL slurry type catalyst system was charged to the reactor; then ethylene was added for a final pressure ranging from 450 to 700 psig. Ethylene concentration in the loop-type polymerization reactor in every run was about 7 to about 8 weight percent. Polymerization reaction time was 180 minutes.

The results of the polymerization reaction runs are listed below in Table I.

TABLE I

| Run | Aromatic Carboxylic Acid | Reactor Pressure, psig | Productivity, g pol/g cat. |
|---|---|---|---|
| 101 | Thiophenoxyacetic acid | 700 | 790 |
| 102 | ($C_6H_5SCH_2COOH$) | 600 | 630 |
| 103 | ($C_6H_5SCH_2COOH$) | 500 | 590 |
| 104 | Phenoxyacetic acid | 700 | 710 |
| 105 | ($C_6H_5OCH_2COOH$) | 600 | 540 |
| 106 | ($C_6H_5OCH_2COOH$) | 450 | 350 |

The data in Table I show that a nickel compound and an aromatic carboxylic acid compound, wherein both have been reacted and supported on an inorganic oxide, can be used to polymerize olefins. The resultant polymer was of such high molecular weight that physical properties could not be determined. The high load melt index (HLMI) and melt index (MI) were both 0 grams/10 minutes. The data in Table I also show that higher reactor pressures produce higher catalyst productivity.

While this invention has been described in detail for the purpose of illustration, it is not to be construed as limited thereby but is intended to cover all changes and modifications within the spirit and scope thereof.

That which is claimed is:

1. A polymerization process comprising contacting at least one mono-1-olefin having 2 to about 8 carbon atoms per molecule with a catalyst system composition comprising:
   a) a nickel compound selected from the group consisting of bis(1,5-cyclooctadiene)nickel(0), bis(tricyclohexylphosphine)nickel(0), nickel tetracarbonyl, (cyclododecatriene)nickel, bis(ethylene)(dicyclohexylphosphine)nickel, and mixtures thereof; and
   b) an aromatic carboxylic acid component consisting essentially of an aromatic moiety and a carboxylic acid functional group, wherein there is an atom linkage between the aromatic moiety and the carboxylic acid functional group; and
   wherein said atom is selected from the group consisting of sulfur and oxygen.

2. A process according to claim 1 further wherein said catalyst composition further comprises an inorganic oxide support.

3. A process according to claim 1 wherein said nickel compound is in a zero valence state.

4. A process according to claim 1 wherein said nickel compound is bis(1,5-cyclooctadiene)nickel(0).

5. A process according to claim 1 wherein said nickel compound is selected from the group consisting of nickel compounds able to undergo reduction to a zero valence state.

6. A process according to claim 1 wherein said aromatic carboxylic acid component has a general formula of

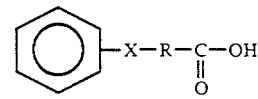

wherein X is selected from the group consisting of oxygen and sulfur; and R is selected from alkylene groups, where R has from 1 to about 10 carbon atoms per group.

7. A process according to claim 6 wherein said aromatic carboxylic acid component is selected from the group consisting of thiophenoxyacetic acid, phenoxyacetic acid, and mixtures thereof.

8. A process according to claim 1 wherein the molar ratio of aromatic carboxylic acid component to nickel compound is within a range of about 0.1 to about 10 moles per mole.

9. A process according to claim 2 wherein said inorganic oxide is selected from the group consisting of a silica, silica-alumina, alumina, fluorided alumina, silated alumina, thoria, aluminophosphate, aluminum phosphate, phosphated silica, phosphated alumina, silica-titania, co-precipitated silica/titania, fluorided/silated alumina, and mixtures thereof.

10. A process according to claim 9 wherein said inorganic oxide support is aluminophosphate.

11. A process according to claim 1 wherein said mono-1-olefin is selected from the group consisting of ethylene, propylene, 1-butene, 1-pentene, 1-hexene, 1-octene, and mixtures thereof.

12. A process according to claim 11 wherein said mono-1-olefin is predominantly ethylene.

13. A process according to claim 12 wherein a comonomer having from about 3 to about 8 carbon atoms per molecule is copolymerized with ethylene to form an ethylene copolymer.

14. A process according to claim 13 wherein said comonomer is selected from the group consisting of propylene, 1-butene, 1-hexene, 4-methyl-1-pentene, 1-octene, and mixtures thereof.

15. A process according to claim 14 wherein said comonomer is present in a polymerization reactor in the range of from about 0.5 to about 20 mole percent.

* * * * *